(12) United States Patent
Sasadate et al.

(10) Patent No.: US 9,690,355 B2
(45) Date of Patent: Jun. 27, 2017

(54) SEMICONDUCTOR DEVICE, POWER CONTROL METHOD, AND STORAGE MEDIUM

(71) Applicant: Kabushiki Kaisha Toshiba, Minato-ku, Tokyo (JP)

(72) Inventors: Kai Sasadate, Tokyo (JP); Ken Kawakami, Kanagawa (JP); Hiroaki Sugita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 14/847,202

(22) Filed: Sep. 8, 2015

(65) Prior Publication Data

US 2016/0282924 A1 Sep. 29, 2016

(30) Foreign Application Priority Data

Mar. 25, 2015 (JP) .................................. 2015-062569

(51) Int. Cl.
 *G06F 1/32* (2006.01)
(52) U.S. Cl.
 CPC .................................. *G06F 1/3234* (2013.01)
(58) Field of Classification Search
 CPC ..... G06F 1/32; G06F 1/26; G06F 1/28; G06F 1/00; G06F 9/44
 USPC ....... 713/300, 310, 320, 321, 322, 323, 324, 713/340, 375
 See application file for complete search history.

(56) References Cited

U.S. PATENT DOCUMENTS

| 8,112,651 | B2 | 2/2012 | Wang et al. |
| 8,176,341 | B2 | 5/2012 | Jeyaseelan et al. |
| 8,181,047 | B2 | 5/2012 | Lee |
| 8,504,855 | B2 | 8/2013 | Frantz et al. |
| 8,631,257 | B2 | 1/2014 | Jeyaseelan et al. |
| 2009/0172428 | A1* | 7/2009 | Lee ........................ G06F 1/3228 713/300 |
| 2011/0173474 | A1 | 7/2011 | Salsbery et al. |
| 2012/0131370 | A1 | 5/2012 | Wang et al. |
| 2012/0140286 | A1* | 6/2012 | Ueda ..................... G06F 1/3228 358/1.16 |

(Continued)

FOREIGN PATENT DOCUMENTS

| JP | 4136228 B2 | 8/2008 |
| JP | 4665697 B2 | 4/2011 |

*Primary Examiner* — Jaweed A Abbaszadeh
*Assistant Examiner* — Keshab Pandey
(74) *Attorney, Agent, or Firm* — White & Case LLP

(57) ABSTRACT

According to an embodiment, a semiconductor device can be in an operating state and a standby state with a choice of a plurality of standby state levels and has a CPU, an interrupt control circuit, and a hardware control circuit. The CPU makes a comparison of a first return time period corresponding to a first standby state level that is a shallowest one selected from among allowable standby state levels set for one or more tasks executed immediately before transition to the standby state with a second return time period selected from among allowable return time periods set for the one or more tasks executed, changes a standby state level of the standby state if the first return time period is judged to be longer than the second return time period as a result of the comparison, and controls the hardware control circuit.

16 Claims, 6 Drawing Sheets

(56) References Cited

U.S. PATENT DOCUMENTS

2013/0103980 A1\* 4/2013 Sasaki ................. G06F 1/26
 714/14
2013/0262899 A1 10/2013 Frantz et al.
2013/0290758 A1\* 10/2013 Quick ................. G06F 1/3203
 713/323

\* cited by examiner

FIG. 2

TBL1

| STANDBY STATE | RETURN TIME PERIOD |
|---|---|
| A | 1msec |
| B | 2msec |
| C | 8msec |
| D | 15msec |
| ... | ... |

DEPTH

SHALLOW

↕

DEEP

FIG. 3

TBL11

| STANDBY STATE | H/W TO BE SUSPENDED | | | | |
|---|---|---|---|---|---|
| | CPU | H/W1 | H/W2 | H/W3 | ... |
| A | O | × | × | × | ... |
| B | O | O | × | × | ... |
| C | O | O | O | × | ... |
| D | O | O | O | O | ... |
| ... | ... | ... | ... | ... | ... |

FIG. 4

TBL2

| TASK | ALLOWABLE STANDBY STATE | ALLOWABLE RETURN TIME PERIOD |
|---|---|---|
| 1 | C | 5msec |
| 2 | C | 3msec |
| 3 | D | 7msec |
| 4 | C | 10msec |
| ... | ... | ... |

FIG. 5

TBL21

| TASK | H/W REQUIRED DURING STANDBY STATE | | | | |
|---|---|---|---|---|---|
| | CPU | H/W1 | H/W2 | H/W3 | ... |
| 1 | x | x | x | O | ... |
| 2 | x | x | x | O | ... |
| 3 | x | x | x | x | ... |
| 4 | x | x | x | O | ... |
| ... | ... | ... | ... | ... | ... |

FIG. 7

TBL12

| STANDBY STATE | H/W TO BE SUSPENDED ||||| RETURN TIME PERIOD |
|---|---|---|---|---|---|---|
| | CPU | H/W1 | H/W2 | H/W3 | ... | |
| A | O | × | × | × | ... | 1msec |
| B | O | O | × | × | ... | 2msec |
| C | O | O | O | × | ... | 8msec |
| D | O | O | O | O | ... | 15msec |
| ... | ... | ... | ... | ... | ... | ... |

FIG. 8

TBL22

| TASK | ALLOWABLE STANDBY STATE | H/W REQUIRED DURING STANDBY STATE ||||| ALLOWABLE RETURN TIME PERIOD |
|---|---|---|---|---|---|---|---|
| | | CPU | H/W1 | H/W2 | H/W3 | ... | |
| 1 | C | × | × | × | O | ... | 5msec |
| 2 | C | × | × | × | O | ... | 3msec |
| 3 | D | × | × | × | × | ... | 7msec |
| 4 | C | × | × | × | O | ... | 10msec |
| ... | ... | ... | ... | ... | ... | ... | ... |

FIG. 9

| TASK | ALLOWABLE STANDBY STATE | H/W REQUIRED DURING STANDBY STATE | | | | ALLOWABLE RETURN TIME PERIOD | FLAG |
|---|---|---|---|---|---|---|---|
| | | CPU | H/W1 | H/W2 | ... | | |
| 1 | C | x | x | x | ... | 5msec | |
| 2 | C/D | x | x | x | ... | 3msec/10msec | 1 |
| 3 | D | x | x | x | ... | 7msec | |
| 4 | C | x | x | x | ... | 10msec | |
| ... | ... | ... | ... | ... | ... | ... | |

TBL23

SEMICONDUCTOR DEVICE, POWER CONTROL METHOD, AND STORAGE MEDIUM

CROSS-REFERENCE TO RELATED APPLICATION

This application is based upon and claims the benefit of priority from the prior Japanese Patent Application No. 2015-62569 filed in Japan on Mar. 25, 2015; the entire contents of which are incorporated herein by reference.

FIELD

An embodiment described herein relates generally to a semiconductor device, a power control method, and a storage medium.

BACKGROUND

Conventionally, a power management method has been adopted in a semiconductor device to be mounted on an information processing apparatus for the sake of power saving. In power management, power control that reduces power consumption is performed by causing a semiconductor device including one or two or more hardware circuits (hereinafter referred to as hardware) to transition from an operating state to a standby state.

Generally, an operating state for a semiconductor device refers to a state in which a software program (hereinafter referred to as a program) is executed by a central processing unit (hereinafter referred to as a CPU). A standby state refers to a state in which a piece (pieces) of hardware, such as a CPU, is (are) out of operation, and an interrupt signal is being waited for. For example, when there is a wait for input of an interrupt signal during execution of a program by the CPU, the semiconductor device transitions to the standby state. When an interrupt signal is generated, the piece(s) of hardware out of operation is (are) woken up, and the semiconductor device transitions from the standby state to the operating state.

A time period from when an interrupt signal is generated while the semiconductor device is in the standby state to when the semiconductor device transitions from the standby state to the operating state is a return time period.

A power management method has also been proposed in recent years which has a plurality of standby states and implements more power saving by varying the number of pieces of hardware to be suspended according to the type of standby state. In the power management method, the standby states include a standby state in which a smaller number of pieces of hardware are suspended, i.e., a shallow standby state and a standby state in which a larger number of pieces of hardware are suspended, i.e., a deep standby state. Generally, as for the above-described return time period, a return time period from the deep standby state to an operating state is longer than a return time period from the shallow standby state to the operating state.

There are a plurality of processes (hereinafter to be referred to as tasks) in a program to be executed by a CPU, and the plurality of tasks are different in processing details from each other. For the reason, the plurality of tasks are different from each other in a depth of a standby state, transition to which is possible, and an allowable return time period duration. If a return time period is impermissibly long, a task cannot execute a process corresponding to an interrupt signal.

For power saving, it is preferable to transition to a standby state with lowest possible consumed power, i.e., a deepest possible standby state. However, as described above, a deeper standby state is longer in a return time period from a standby state to an operating state.

For the reason, if a plurality of tasks are executed, a standby state with a short return time period and a safe depth is set as a standby state to be transitioned so as not to cause a system collapse, i.e., so as to ensure operation of hardware at a time of execution of the resumed tasks.

However, if the number of tasks being executed increases or decreases due to, e.g., motion of a program, a return time period of the standby state to be transitioned may be long depending on tasks being executed. Even in the case, the standby state to be transitioned is the set standby state with the short return time period. For the reason, even though a system collapse may not occur depending on tasks being executed, there is a problem that a deeper standby state is not set as the standby state to be transitioned.

The idea of associating the type of an interrupt signal with a depth of a standby state is also conceivable. However, since a change in hardware suspended in a standby state may increase a return time period, definition of a return time period according to the type of an interrupt signal may cause a system collapse.

BRIEF DESCRIPTION OF THE DRAWINGS

FIG. 2 is a chart showing an example of a standby state transition information table according to the embodiment;

FIG. 3 is a chart showing an example of a suspended hardware by standby state table which stores information on a piece (pieces) of hardware to be suspended for each standby state, according to the embodiment;

FIG. 4 is a chart showing an example of a task transition information table according to the embodiment;

FIG. 5 is a chart showing an example of a required hardware by task table which stores information on a piece (pieces) of hardware required during a standby state for each task, according to the embodiment;

FIG. 7 is a chart showing an example of a standby state transition information table TBL12, into which a standby state transition information table TBL1 and a suspended hardware by standby state table TBL11 are integrated, according to a first modification of the embodiment;

FIG. 8 is a chart showing an example of a task transition information table TBL22, into which a task transition information table TBL2 and a required hardware by task table TBL21 are integrated, according to a second modification of the embodiment; and FIG. 9 is a chart showing an example of a task transition information table TBL23 according to a third modification of the embodiment.

DETAILED DESCRIPTION

A semiconductor device according to an embodiment is a semiconductor device capable of being in an operating state and a standby state with a choice of a plurality of standby state levels, comprising a CPU capable of executing a plurality of tasks, an interrupt control circuit configured to generate an interrupt signal for transition from the standby state to the operating state, and a power control circuit configured to control operation of each of a plurality of hardware circuits and control power consumed by the plurality of hardware circuits, under control of the CPU, wherein the CPU makes a comparison of a first return time period corresponding to a first standby state level that is a shallowest one selected from among allowable standby state levels set for one or more tasks executed immediately before transition to the standby state with a shortest first allowable return time period selected from among allowable return time periods set for the one or more tasks executed, sets a standby state level of the standby state to the first standby state level if the first return time period is judged to be not more than the first allowable return time period, changes a standby state level of the standby state to a second standby state level having a return time period shorter than the first return time period if the first return time period is judged to be longer than the first allowable return time period, and controls the power control circuit.

An embodiment will be described below with reference to the drawings.

Configuration

Figure 1:
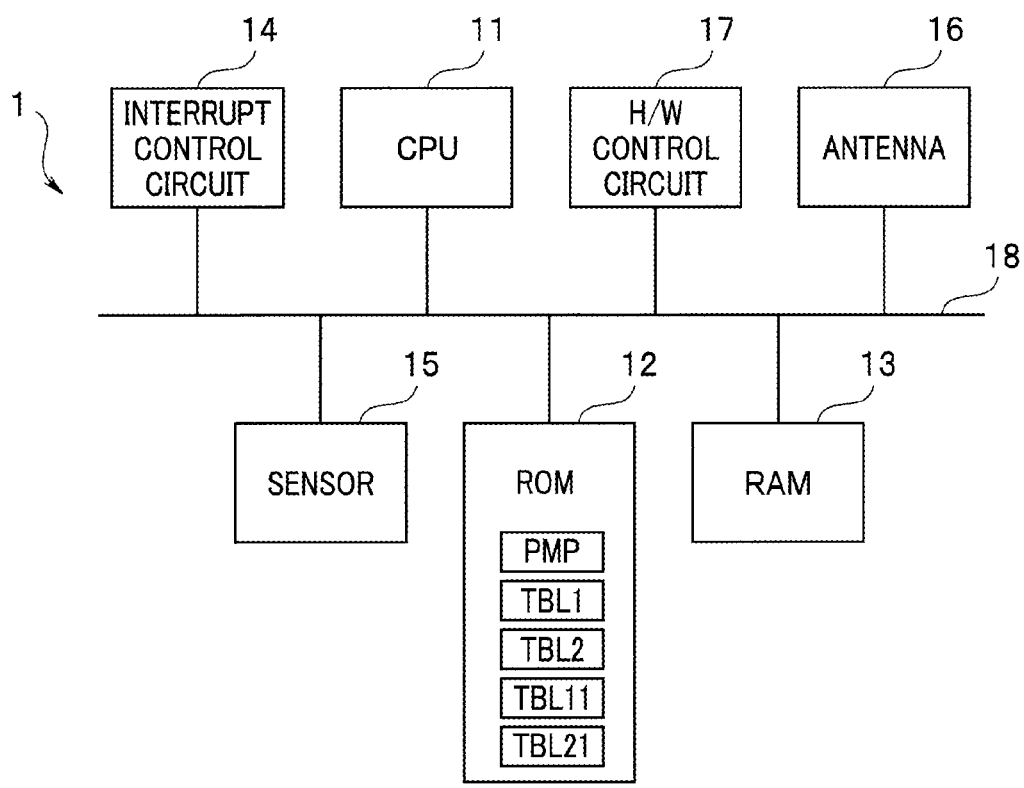
FIG. 1 is a block diagram of a semiconductor device 1 according to an embodiment.

FIG. 1 is a block diagram of a semiconductor device according to the present embodiment.

A semiconductor device 1 has a CPU 11, a ROM 12, a RAM 13, an interrupt control circuit 14, a sensor 15, an antenna 16, and a hardware (H/W) control circuit 17. The CPU 11, the ROM 12, the RAM 13, the interrupt control circuit 14, the sensor 15, the antenna 16, and the hardware control circuit 17 are connected to one another via a bus 18.

The semiconductor device 1 is mounted on an information processing apparatus, such as a smartphone, a personal computer, or one of various types of mobile equipment, and executes a program adapted for implementation of a desired function.

The CPU 11 executes processing for a predetermined function by reading out a plurality of tasks stored in the ROM 12, loading the plurality of tasks onto the RAM 13, and executing the plurality of tasks. That is, the CPU 11 is capable of executing a plurality of tasks. A task is, for example, a process corresponding to an output from the sensor, or communication processing. The CPU 11 transmits/receives data to/from a different hardware circuit (hereinafter also simply referred to as hardware) other than the CPU 11 via the bus 18. Thus, when the semiconductor device 1 mounted on the information processing apparatus is in an operating state, tasks to be executed by the CPU 11 change according to a function to be implemented.

The ROM 12 stores not only the plurality of tasks described above but also a power control program to be described later and information on tables storing various types of information to be described later.

The interrupt control circuit 14 is a circuit configured to receive an interrupt signal from outside or the like.

The sensor 15 is a sensor for sensing acceleration and a circuit for the sensor and may have a plurality of sensors.

The antenna 16 is an antenna for wireless communication and is, for example, an antenna for Wi-Fi communication and a circuit for the antenna.

The CPU 11 is capable of acquiring data sensed by the sensor 15 and transmitting/receiving data to/from the antenna 16.

The hardware control circuit 17 as a power control circuit is a circuit configured to perform control for starting up and suspending hardware other than the hardware control circuit 17 in the semiconductor device 1. The hardware control circuit 17 starts up and suspends hardware based on a command signal from the CPU 11.

More specifically, the CPU 11 transmits a power control command signal to the hardware control circuit 17 via the bus 18. The hardware control circuit 17 supplies a power control signal corresponding to the received power control command signal to hardware for which power control is to be performed via the bus 18. Each piece of hardware is started up or suspended in accordance with the received power control signal.

In FIG. 1, pieces of hardware targeted for power control are pieces of hardware other than the interrupt control circuit 14 in the semiconductor device 1. In the present embodiment, the CPU 11, the ROM 12, the RAM 13, the sensor 15, and the antenna 16 are pieces of hardware targeted for power control.

Start-up and suspension of hardware are each performed through power gating that controls supply of power to each piece of hardware and suspension of the supply, clock gating that controls supply of a clock signal to each piece of hardware and suspension of the supply, and the like. A power control signal for power gating and the like is supplied from the hardware control circuit 17 to each piece of hardware. That is, the hardware control circuit 17 constitutes a power control circuit configured to control operation of each of a plurality of hardware circuits through power gating, clock gating, and the like and control power consumed by the plurality of hardware circuits.

The semiconductor device 1 shown in FIG. 1 is mounted on the information processing apparatus, such as a smartphone, and executes various types of tasks corresponding to a function specified by a user. When there is a wait for input of an interrupt signal during task execution, the semiconductor device 1 is caused by a power management function to transition to a standby state for power saving. When the semiconductor device 1 receives an interrupt signal from the interrupt control circuit 14 after the transition to the standby state, the semiconductor device 1 transitions from the standby state to the operating state. A plurality of standby state levels are available for the standby state. The semiconductor device 1 is a device capable of being in the operating state and the standby state with a choice of the plurality of standby state levels.

Power management by the semiconductor device 1 is performed by the CPU 11 reading out and executing the power control program stored in the ROM 12.

Various types of tables used when a power control program PMP is executed will be described first. The CPU 11 reads out a standby state transition information table TBL1 and a task transition information table TBL2 from the ROM 12 and loads the standby state transition information table TBL1 and the task transition information table TBL2 onto the RAM 13.

Note that although the standby state transition information table TBL1 and the task transition information table TBL2 are stored in the ROM 12 in the present embodiment, the standby state transition information table TBL1 and the task transition information table TBL2 may be stored in a device outside the semiconductor device 1, and the CPU 11 may acquire information of the standby state transition information table TBL1 and the task transition information table TBL2 through communication.

FIG. 2 is a chart showing an example of a standby state transition information table.

The standby state transition information table TBL1 stores information on a standby state and a return time period. Note that information on a return time period corresponding to a piece (pieces) of hardware to be suspended for each standby state in the standby state transition information table TBL1 is determined by the CPU 11 referring to information on a piece (pieces) of hardware to be suspended for each standby state (a suspended hardware by standby state table TBL11 to be described later). That is, a return time period corresponding to a standby state level is determined based on information on a hardware circuit (hardware circuits) to be suspended for each standby state level.

Among standby states A, B, C, and D, a depth of the standby state A is shallower than depths of the standby states B, C, and D, and the depth of the standby state D is deeper than the depths of the standby states A, B, and C. Each reference alphabetic character denotes a depth level of a standby state, i.e., a standby state level. A depth of a standby state increases from a top to a bottom of the standby state transition information table TBL1 (in alphabetical order).

As described above, a return time period in the standby state transition information table TBL1 is determined based on the suspended hardware by standby state table TBL11.

FIG. 3 is a chart showing an example of a suspended hardware by standby state table which stores information on a piece (pieces) of hardware to be suspended for each standby state.

The suspended hardware by standby state table TBL11 shown in FIG. 3 is stored in the ROM 12. The CPU 11 reads out the suspended hardware by standby state table TBL11 from the ROM 12 and loads the suspended hardware by standby state table TBL11 onto the RAM 13. Information on a piece (pieces) of hardware to be suspended is stored for each standby state in the suspended hardware by standby state table TBL11.

Pieces of hardware to be suspended include the CPU 11 and also include hardware other than the CPU 11, such as the ROM 12, the RAM 13, the sensor 15, or the antenna 16. Hardware (H/W) 1, hardware 2, hardware 3, hardware 4, . . . in FIG. 3 are pieces of hardware other than the CPU 11, such as the ROM 12. In FIG. 3, a piece of hardware to be suspended is denoted by ○ while a piece of hardware not to be suspended is denoted by x.

As pieces of hardware to be suspended, the CPU 11 and other pieces of hardware are set in the suspended hardware by standby state table TBL11. FIG. 3 shows that, in the standby state A, the CPU 11 is suspended while hardware 1, hardware 2, and hardware 3 are not suspended, that, in the standby state B, the CPU 11 and hardware 1 are suspended while hardware 2 and hardware 3 are not suspended, that, in the standby state C, the CPU 11 and hardware 1 and hardware 2 are suspended while hardware 3 is not suspended, and that, in the standby state D, the CPU 11 and hardware 1, hardware 2, and hardware 3 are suspended.

A return time period for each standby state is defined in advance according to specifications of one or two or more pieces of hardware to be suspended and the like. That is, the return time period is determined based on a time period from when the one or two or more suspended pieces of hardware are woken up to when the one or two or more woken-up pieces of hardware enter a normal operating state.

Thus, the CPU 11 refers to the suspended hardware by standby state table TBL11 shown in FIG. 3 recorded on the ROM 12 and determines or calculates a return time period for each standby state. That is, the semiconductor device 1 has the suspended hardware by standby state table TBL11 that stores information on hardware circuits to be suspended for each of the plurality of standby state levels. A return time period corresponding to a standby state level for a task executed immediately before transition to a standby state is determined by referring to the suspended hardware by standby state table TBL11 based on the standby state level.

Note that the CPU 11 need not store the suspended hardware by standby state table TBL11 shown in FIG. 3 in the ROM 12 and may store only the standby state transition information table TBL1 as shown in FIG. 2, in which a determined return time period corresponding to a standby state is set in advance, in the ROM 12.

Also, note that the CPU 11 may acquire the suspended hardware by standby state table TBL11 from an external server or the like through communication.

FIG. 4 is a chart showing an example of a task transition information table.

The task transition information table TBL2 stores transition information for a task targeted for control by the power control program PMP.

Transition information for all or some of tasks executable by the CPU 11 are stored in the task transition information table TBL2. Transition information for one or two or more tasks targeted for control by the power control program PMP is stored in the task transition information table TBL2.

The task transition information table TBL2 stores information on a task, an allowable standby state, and an allowable return time period. Note that information on an allowable standby state for each task in the task transition information table TBL2 is determined by the CPU 11 referring to information on a piece (pieces) of hardware required during a standby state for each task (a required hardware by task table TBL21 to be described later).

A piece (pieces) of hardware required during a standby state is (are) pre-established for each task. For example, if a given task needs only the antenna 16 to operate during a standby state, the antenna 16 is a piece of hardware which needs to operate during the standby state for the task, i.e., a piece of hardware required during the standby state.

Thus, the CPU 11 can determine an allowable standby state based on information on a piece (pieces) of hardware required during a standby state for each task. That is, the semiconductor device 1 has the task transition information table TBL2 as a storage section which stores information on an allowable return time period for each of a plurality of tasks. A standby state level for a task executed immediately before transition to a standby state is determined based on information on a hardware circuit required during a standby state which is prescribed for each of the plurality of tasks.

An allowable return time period is also pre-established for each task according to processing details of the task. For example, if a given task needs to execute a predetermined process within a predetermined time period of reception of an interrupt signal, an allowable, i.e., permissible return time period is inevitably determined.

FIG. 4 shows that an allowable standby state and an allowable return time period are the standby state C and 5 msec, respectively, for task 1, that an allowable standby state and an allowable return time period are the standby state C and 3 msec, respectively, for task 2, that an allowable standby state and an allowable return time period are the standby state D and 7 msec, respectively, for task 3, and that an allowable standby state and an allowable return time period are the standby state C and 10 msec, respectively, for task 4.

For example, for task 2, the allowable return time period is set to 3 msec from a predetermined specification. That is, since a specification for processing by task 2 needs the semiconductor device 1 to revert from a standby state to a return state within 3 msec, the allowable return time period for task 2 is set to 3 msec.

In the above-described manner, an allowable standby state, i.e., a standby state depth and an allowable return time period are stored or determined and set in the task transition information table TBL2 for each task.

As described above, the CPU 11 determines an allowable standby state for each task in the task transition information table TBL2 by referring to information on a piece (pieces) of hardware required during a standby state. Information on a piece (pieces) of hardware required during a standby state is stored in the required hardware by task table.

FIG. 5 is a chart showing an example of a required hardware by task table which stores information on a piece (pieces) of hardware required to operate during a standby state for each task.

A required hardware by task table TBL21 shown in FIG. 5 is stored in the ROM 12. The CPU 11 reads out the required hardware by task table TBL21 from the ROM 12 and loads the required hardware by task table TBL21 onto the RAM 13.

The required hardware by task table TBL21 shown in FIG. 5 stores information on a task and a piece (pieces) of hardware required to operate during a standby state. Information on a piece (pieces) of hardware required to operate during a standby state is stored for each task in the required hardware by task table TBL21. In FIG. 5, a piece of hardware required to operate during a standby state is denoted by ○ while a piece of hardware not required to operate during the standby state is denoted by x.

FIG. 5 shows that hardware required to operate during a standby state is hardware 3 for task 1 and task 2, that hardware required to operate during a standby state are not the CPU 11, hardware 1, hardware 2, and hardware 3 for task 3, and that hardware required to operate during a standby state is hardware 3 for task 4.

The CPU 11 determines, for each task, a standby state in which a piece (pieces) of hardware required to operate during a standby state is (are) not suspended by referring to the suspended hardware by standby state table TBL11 shown in FIG. 3 based on the required hardware by task table TBL21 shown in FIG. 5. The CPU 11 sets a standby state determined for each task as an allowable standby state for the task in FIG. 4 in the task transition information table TBL2. At the time, an allowable standby state in FIG. 4 is set for each task through reference to the standby state transition information table TBL1 such that one longest in return time period is selected if there are a plurality of standby states satisfying requirements in the required hardware by task table TBL21 in FIG. 5 among standby states in FIG. 3.

Thus, the CPU 11 determines or calculates an allowable standby state by referring to the required hardware by task table TBL21 recorded on the ROM 12 and shown in FIG. 5.

As has been described above, in the present embodiment, the semiconductor device 1 has the required hardware by task table TBL21 that is a storage section storing information on a hardware circuit (hardware circuits) required to operate during a standby state which is prescribed for each of a plurality of tasks. As will be described later, a standby state level for a task executed is determined based on information on a hardware circuit (hardware circuits) required to operate during a standby state which is stored in the required hardware by task table TBL21.

Note that the CPU 11 may store only the task transition information table TBL2 as shown in FIG. 4, in which an allowable standby state for each task is set in advance, in the ROM 12 without storing the required hardware by task table TBL21 shown in FIG. 5 in the ROM 12.

Also, note that the CPU 11 may acquire the required hardware by task table TBL21 from an external server or the like through communication. With the configuration, it is possible to easily respond to a change in processing details of a task.

Action

Operation when the semiconductor device 1 described above is caused by the power control program PMP to transition from the operating state to a standby state will be described.

Figure 6:
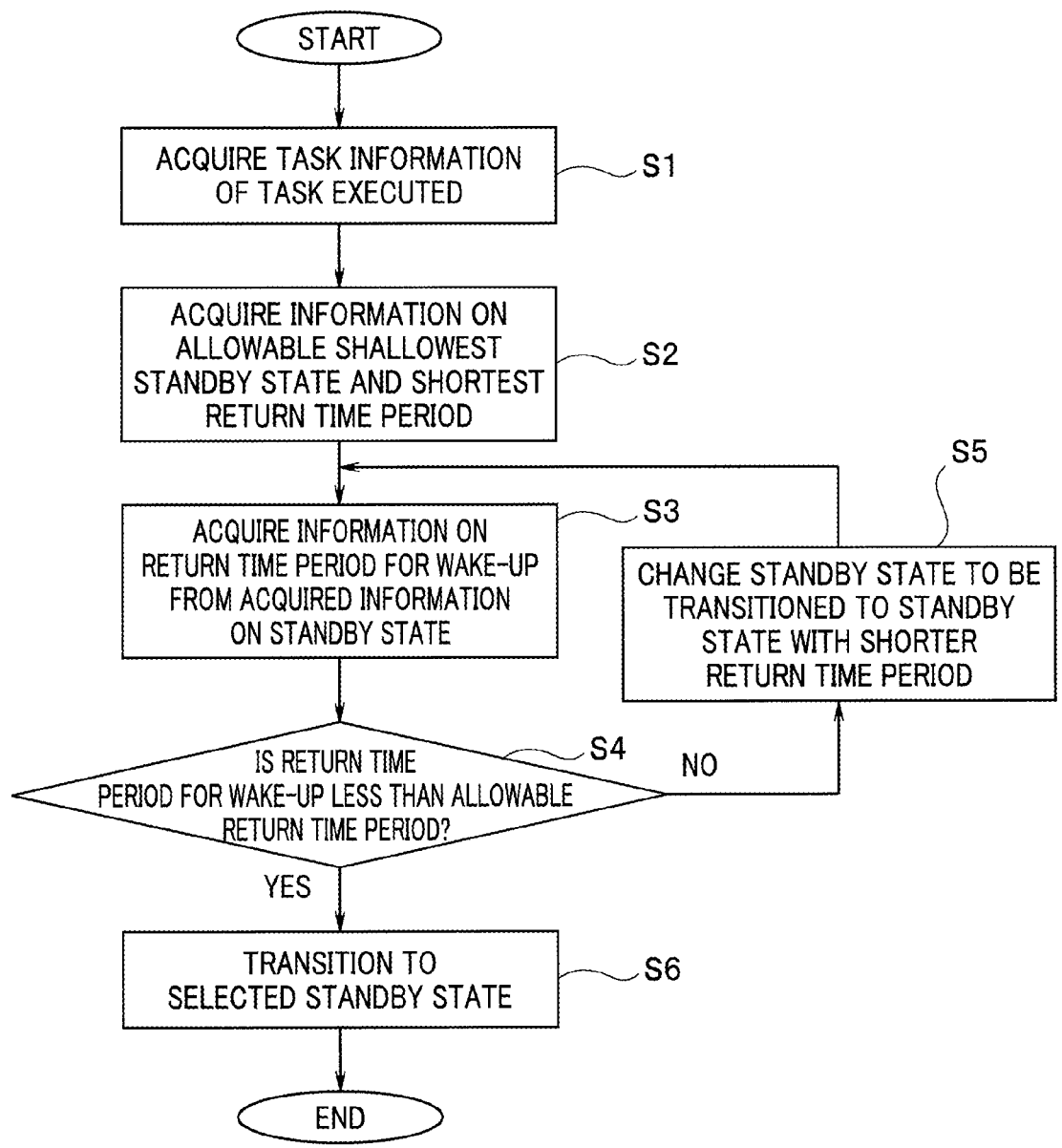
FIG. 6 is a flowchart of processing by a power control program PMP when there is a wait for input of an interrupt signal during execution of a plurality of tasks by a CPU 11 of the semiconductor device 1, and hardware transitions to a standby state, according to the embodiment.

FIG. 6 is a flowchart of processing by the power control program PMP when, during execution of a plurality of tasks by the CPU 11 of the semiconductor device 1, there is a wait for input of an interrupt signal, and hardware transitions to a standby state.

The CPU 11 executes the power control program PMP in FIG. 6 when hardware of the semiconductor device 1 transitions from the operating state to a standby state. The power control program PMP is read out from the ROM 12 and is executed.

The CPU 11 first acquires task information on a task (tasks) executed so far from the task transition information table TBL2 (S1).

The CPU 11 is capable of executing various types of tasks, and the types and number of tasks being executed vary in real time. For example, if tasks 1, 2, 3, and 4 have been executed immediately before transition to a standby state, the CPU 11 acquires task transition information on tasks 1, 2, 3, and 4 from the task transition information table TBL2.

That is, the task transition information table TBL2 includes information on an allowable standby state for each of a plurality of tasks. The process in S1 constitutes a task information acquisition section configured to acquire information on a standby state level of an allowable standby state for each of one or more tasks executed immediately before transition to a standby state and an allowable return time period set for the task executed from the task transition information table TBL2.

The CPU 11 acquires information on an allowable standby state with a shallowest depth and information on a shortest allowable return time period from the acquired task information (S2).

For example, in FIG. 4, pieces of information with the standby state C are selected and acquired as information on an allowable standby state with the shallowest depth among the information for tasks 1 to 4, and information with a shortest allowable return time period of 3 msec is selected and acquired.

The CPU 11 then refers to the standby state transition information table TBL1 and acquires information on a return time period for wake-up for the standby state selected and acquired in S2 (S3).

For example, if the allowable standby state selected and acquired in S2 is the standby state C in FIG. 4, information of 8 msec that is a return time period for the standby state C in the standby state transition information table TBL1 is acquired.

That is, the semiconductor device 1 has the standby state transition information table TBL1 storing a return time period for each of a plurality of standby state levels. A return time period corresponding to a standby state level of an allowable standby state for a task executed immediately before transition to a standby state is determined by referring to the standby state transition information table TBL1 based on the standby state level.

The CPU 11 then judges whether the return time period for hardware wake-up acquired in S3 is less than the allowable return time period acquired in S2 (S4).

For example, in FIGS. 2 and 4, the return time period acquired in S3 is 8 msec, and the allowable return time period acquired in S2 is 3 msec. The return time period acquired in S3 is not less than the allowable return time period (NO in S4), the process shifts to S5.

That is, if NO in S4, a standby state (the standby state C in the above-described case) set to have a shortest allowable return time period among allowable standby states for the plurality of tasks executed has been selected. Thus, even if the semiconductor device 1 transitions from the standby state to the operating state within the shortest allowable return time period (3 msec), the tasks, execution of which is resumed after the return, may fail to operate normally.

If NO in S4, the CPU 11 changes a standby state to be transitioned to a standby state with a shorter return time period, i.e., a shallower standby state (S5).

For example, in FIG. 4, the standby state B with a shallowest depth next to the standby state C is temporarily selected as the standby state to be transitioned.

After S5, the process returns to S3. The CPU 11 acquires information on a return time period for return from a standby state to the operating state by referring to the standby state transition information table TBL1 using information on the standby state changed and selected in S5 (S3). Since the standby state selected in S5 is the standby state B, the information of 2 msec that is a return time period for the standby state B is acquired from FIG. 2.

The CPU 11 then judges whether the return time period acquired in S3 is less than the allowable return time period acquired in S2 (S4). In the above-described example, since the return time period acquired in S3 is 2 msec, and the allowable return time period acquired in S2 is 3 msec, the return time period is less than the allowable return time period (YES in S4).

The CPU 11 causes one or two or more pieces of hardware in the semiconductor device 1 to transition to the standby state selected in S2 or S5 (S6).

The standby state selected in S2 is a standby state with a shortest return time period among allowable standby states for the individual tasks. The standby state selected through the change in S5 is a standby state with a shorter return time period.

In S6, the CPU 11 transmits a power control command for change to the standby state selected in S2 or S5 to the hardware control circuit 17.

Thus, the CPU 11 makes a comparison of a return time period (8 msec in the above example) corresponding to a standby state level which is a shallowest level selected from among allowable standby state levels set for one or more tasks executed immediately before transition to a standby state with a shortest allowable return time period (3 msec in the above example) selected from among allowable return time periods set for the one or more tasks executed. In S4, the comparison is made using a shortest return time period among allowable return time periods for tasks executed.

If it is judged in S4 that the return time period (8 msec in the above example) corresponding to a standby state level of an allowable standby state for the tasks executed is longer than an allowable return time period (3 msec in the above example) set for the tasks executed, the CPU 11 changes a standby state level of the standby state to a standby state level having a return time period (2 msec in the above example) shorter than the return time period corresponding to the standby state level of the allowable standby state for the tasks executed and controls the hardware control circuit 17.

As a result, the hardware in the semiconductor device 1 transitions to the standby state selected in S2 or S5 (S6).

When an interrupt signal is generated after the semiconductor device 1 enters the standby state, the interrupt control circuit 14 detects an interrupt, and the semiconductor device 1 transitions to the operating state.

As has been described above, according to the above-described embodiment, a semiconductor device and a power control method for performing power control such that transition to a deepest possible standby state is achieved according to a task (tasks) being executed can be provided.

Note that, in a semiconductor device having a plurality of operating modes, the above-described power control may be executed for each operating mode.

An example of the semiconductor device 1 is a semiconductor device which has a plurality of operating modes and is capable of execution in a plurality of operating modes specified. In such a semiconductor device, different tasks are executed in each operating mode.

In such a semiconductor device, the above-described power control may be executed for each operating mode. Even if tasks to be executed differ among operating modes, power control can be performed according to a task (tasks) being executed in each operating mode such that transition to a deepest possible standby state is achieved.

Modifications will be described.

First Modification

In the above-described embodiment, the standby state transition information table TBL1 shown in FIG. 2 and the suspended hardware by standby state table TBL11 shown in FIG. 3 are separate tables. The standby state transition information table TBL1 and the suspended hardware by standby state table TBL11 may be integrated into one.

FIG. 7 is a chart showing an example of a standby state transition information table TBL12, into which the standby state transition information table TBL1 and the suspended hardware by standby state table TBL11 are integrated. The standby state transition information table TBL12 is registered in the ROM 12.

In the standby state transition information table TBL12 as in FIG. 7 as well, a return time period for each standby state may be determined from information on a piece (pieces) of hardware to be suspended.

Second Modification

In the embodiment and the first modification described above, the task transition information table TBL2 shown in FIG. 4 and the required hardware by task table TBL21 shown in FIG. 5 are separate tables. The task transition information table TBL2 and the required hardware by task table TBL21 may be integrated into one.

FIG. 8 is a chart showing an example of a task transition information table TBL22, into which the task transition information table TBL2 and the required hardware by task table TBL21 are integrated. The task transition information table TBL22 is registered in the ROM 12.

In the task transition information table TBL22 as in FIG. 8 as well, an allowable standby state for each task may be determined from information on a piece (pieces) of hardware required to operate during a standby state shown in FIG. 5 and the suspended hardware by standby state table TBL11 shown in FIG. 3 or the standby state transition information table TBL12 shown in FIG. 7 so as to be a standby state having a standby state level with a longest return time period.

Third Modification

In a task transition information table according to each of the embodiment and the first and second modifications described above, one allowable standby state and one allowable return time period are set for each task. A plurality of allowable standby states and a plurality of allowable return time periods may be set according to an execution status of each task. For example, in communication processing, only a short return time period and a shallow standby state may be allowed at a start so as to support high-speed communication, and a long return time period and a deep standby state may be allowed later with a longer communication interval.

FIG. 9 is a chart showing an example of a task transition information table TBL23 according to the present third modification. In FIG. 9, the two standby states C and D are set as allowable standby states, and two return time periods of 3 msec and 10 msec are set as allowable return time periods, for task 2.

Which one of the two set is used is determined by a status of a flag provided in the task transition information table TBL23.

In FIG. 9, the flag can take either "1" or "0," and an allowable standby state and an allowable return time period for the task are specified according to a value of the flag. For example, if the flag is "0," the standby state C is set as the allowable standby state, and the allowable return time period is set to 3 msec, for task 2. If the flag is "1," the standby state D is set as the allowable standby state, and the allowable return time period is set to 10 msec, for task 2.

Note that although a flag is set for one task of a plurality of tasks in FIG. 9, two allowable standby states and two allowable return time periods may be set for each of one or more tasks.

Also, note that although a flag can be in two states in the modification, a flag may be information which can be in three or more states. In the case, one allowable standby state and one allowable return time period can be specified from information on three or more allowable standby states and three or more allowable return time periods using a flag.

That is, the task transition information table TBL23 stores a plurality of pieces of information on respective allowable standby states and respective allowable return time periods for at least one of a plurality of tasks. In the process in S1, an allowable standby state and an allowable return time period specified by a flag are acquired from information on a plurality of allowable standby states and a plurality of allowable return time periods.

With the above-described configuration, an allowable standby state and an allowable return time period can be changed according to an execution status of a task.

As has been described above, according to the embodiment and individual modifications described above, a semiconductor device and a power control method for performing power control according to a task (tasks) being executed so as to achieve transition to a deepest possible standby state can be provided.

Note that a program which executes the above-described operation is recorded or stored in whole or in part as a computer program product in a portable medium, such as a flexible disk or a CD-ROM, or a non-transitory computer-readable medium which is a storage medium, such as a hard disk. The program is read by a computer, and the operation is executed in whole or in part. Alternatively, a whole or a part of the program can be distributed or provided via a communication network. A user can easily implement a semiconductor device and a power control method according to the present embodiment by downloading the program via the communication network and storing the program in the semiconductor device or storing the program from a recording medium in the semiconductor device.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A semiconductor device capable of being in an operating state and a standby state with a choice of a plurality of standby state levels, comprising:
    a CPU capable of executing a plurality of tasks;
    an interrupt control circuit configured to generate an interrupt signal for transition from the standby state to the operating state; and
    a power control circuit configured to control operation of each of a plurality of hardware circuits and control power consumed by the plurality of hardware circuits, under control of the CPU,
    wherein the CPU
    makes a comparison of a first return time period corresponding to a first standby state level that is a shallowest one selected from among allowable standby state levels set for one or more tasks executed immediately before transition to the standby state with a shortest first allowable return time period selected from among allowable return time periods set for the one or more tasks executed, and
    sets a standby state level of the standby state to the first standby state level if the first return time period is judged to be not more than the first allowable return time period, changes the standby state level of the standby state to a second standby state level having a return time period shorter than the first return time period if the first return time period is judged to be longer than the first allowable return time period, and controls the power control circuit.

2. The semiconductor device according to claim 1, wherein
    the first standby state level is determined based on information on a hardware circuit required during the standby state which is prescribed for each of the plurality of tasks.

3. The semiconductor device according to claim 2, further comprising a first storage section storing the information on the hardware circuit required during the standby state that is prescribed for each of the plurality of tasks, wherein the CPU determines the first standby state level for the tasks executed based on the information on the hardware circuit required during the standby state stored in the first storage section.

4. The semiconductor device according to claim 1, further comprising a second storage section storing a first table which includes information on the allowable return time period and information on the allowable standby state level for each of the plurality of tasks, wherein the CPU acquires the information on the allowable standby state level and the information on the allowable return time period from the first table, and makes the comparison using a return time period corresponding to the first standby state level that is shallowest one among the allowable standby state levels as the first return time period and a shortest allowable return time period among the allowable return time periods as the first allowable return time period.

5. The semiconductor device according to claim 4, wherein the second storage section stores a plurality of pieces of information on the allowable standby state level and the allowable return time period for at least one of the plurality of tasks, and the CPU acquires the allowable standby state level and the allowable return time period from a specified one of the pieces of information on the allowable standby state and the allowable return time period.

6. The semiconductor device according to claim 1, further comprising a third storage section storing a return time period for each of the plurality of standby state levels, wherein the first return time period is determined by referring to the third storage section based on the first standby state level.

7. A power control method for controlling power consumed by a semiconductor device, the semiconductor device comprising a CPU capable of executing a plurality of tasks and a power control circuit configured to control operation of each of a plurality of hardware circuits and control power consumed by the plurality of hardware circuits, under control of the CPU, and being capable of being in an operating state and a standby state with a choice of a plurality of standby state levels, wherein the CPU makes a comparison of a first return time period corresponding to a first standby state level that is a shallowest one selected from among allowable standby state levels set for one or more tasks executed immediately before transition to the standby state with a shortest first allowable return time period selected from among allowable return time periods set for the one or more tasks executed, and sets a standby state level of the standby state to the first standby state level if the first return time period is judged to be not more than the first allowable return time period, changes the standby state level of the standby state to a second standby state level having a return time period shorter than the first return time period if the first return time period is judged to be longer than the first allowable return time period, and controls the power control circuit.

8. The power control method according to claim 7, wherein the first standby state level is determined based on information on the hardware circuit required during the standby state which is prescribed for each of the plurality of tasks.

9. The power control method according to claim 8, wherein the semiconductor device further comprises a first storage section storing the information on a hardware circuit required during the standby state that is prescribed for each of the plurality of tasks, and the comparison comprises determining the first standby state level for the tasks executed based on the information on the hardware circuit required during the standby state stored in the first storage section.

10. The power control method according to claim 7, wherein the semiconductor device further comprises a second storage section storing a first table which includes information on the allowable return time period and information on the allowable standby state level for each of the plurality of tasks, and the comparison comprises acquiring the information on the allowable standby state level and the information on the allowable return time period from the first table, and making the comparison using a return time period corresponding to the first standby state level that is shallowest one among the allowable standby state levels as the first return time period and a shortest allowable return time period among the allowable return time periods as the first allowable return time period.

11. The power control method according to claim 10, wherein the second storage section stores a plurality of pieces of information on the allowable standby state level and the allowable return time period for at least one of the plurality of tasks, and the comparison comprises acquiring the allowable standby state level and the allowable return time period from a specified one of the pieces of information on the allowable standby state level and the allowable return time period.

12. A non-transitory computer-readable storage medium storing a program which executes a power control method for controlling power consumed by a semiconductor device, the semiconductor device comprising a CPU capable of executing a plurality of tasks and a power control circuit configured to control operation of each of a plurality of hardware circuits and control power consumed by the plurality of hardware circuits, under control of the CPU, and being capable of being in an operating state and a standby state with a choice of a plurality of standby state levels, the program being for causing the CPU to implement:

making a comparison of a first return time period corresponding to a first standby state level that is a shallowest one selected from among allowable standby state levels set for one or more tasks executed immediately before transition to the standby state with a shortest first allowable return time period selected from among allowable return time periods set for the one or more tasks executed; and setting a standby state level of the standby state to the first standby state level if the first return time period is judged to be not more than the first allowable return time period, changing the standby state level of the standby state to a second standby state level having a return time period shorter than the first return time period if the first return time period is judged to be longer than the first allowable return time period, and controlling the power control circuit.

13. The storage medium according to claim 12, wherein the first standby state level is determined based on information on a hardware circuit required during the standby state which is prescribed for each of the plurality of tasks.

14. The storage medium according to claim 13, wherein the semiconductor device further comprises a first storage section storing the information on the hardware circuit required during the standby state that is prescribed for each of the plurality of tasks, and the making the comparison comprises determining the first standby state level for the tasks executed based on the information on the hardware circuit required during the standby state stored in the first storage section.

15. The storage medium according to claim 12, wherein the semiconductor device further comprises a second storage section storing a first table which includes information on the allowable return time period and information on the allowable standby state level for each of the plurality of tasks, and the making the comparison comprises acquiring the information on the allowable standby state level and the information on the allowable return time period from the first table, and making the comparison using a return time period corresponding to the first standby state level that is shallowest one among the allowable standby state levels as the first return time period and a shortest allowable return time period among the allowable return time periods as the first allowable return time period.

16. The storage medium according to claim 15, wherein the second storage section stores a plurality of pieces of information on the allowable standby state level and the allowable return time period for at least one of the plurality of tasks, and the making the comparison comprises acquiring the allowable standby state level and the allowable return time period from a specified one of the pieces of information on the allowable standby state level and the allowable return time period.

* * * * *